(12) United States Patent
Easwaran (10) Patent No.: US 9,343,898 B2
(45) Date of Patent: May 17, 2016

(54) DRIVER CURRENT CONTROL APPARATUS AND METHODS (71) Applicant: TEXAS INSTRUMENTS INCORPORATED

(72) Inventor: Sri Navaneethakrishnan Easwaran, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 270 days.

(21) Appl. No.: 13/971,351

(22) Filed: Aug. 20, 2013

(65) Prior Publication Data

US 2015/0022923 A1 Jan. 22, 2015
US 2015/0318691 A2 Nov. 5, 2015

(51) Int. Cl.
*H02H 9/02* (2006.01)
*G01F 1/66* (2006.01)
*H02H 9/00* (2006.01)

(52) U.S. Cl.
CPC ............... *H02H 9/025* (2013.01); *G01F 1/662* (2013.01); *G01F 1/667* (2013.01); *H02H 9/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,463,252 A | * | 10/1995 | Jones et al. | 257/723 |
| 5,973,368 A | * | 10/1999 | Pearce et al. | 257/368 |
| 6,340,878 B1 | * | 1/2002 | Oglesbee | 320/150 |
| 7,042,280 B1 | * | 5/2006 | Huang et al. | 327/541 |
| 7,450,354 B2 | * | 11/2008 | Tain et al. | 361/18 |
| 2008/0055796 A1 | * | 3/2008 | Chu | H02H 9/045 361/18 |
| 2008/0061876 A1 | * | 3/2008 | Kaya et al. | 330/207 P |
| 2009/0033298 A1 | * | 2/2009 | Kleveland | 323/271 |
| 2011/0216468 A1 | | 9/2011 | Easwaran | |
| 2014/0084994 A1 | * | 3/2014 | Merkin et al. | 327/543 |

* cited by examiner

*Primary Examiner* — Thienvu Tran
*Assistant Examiner* — Angela Brooks
(74) *Attorney, Agent, or Firm* — Gregory J. Albin; Frank D. Cimino (57) ABSTRACT

Apparatus and methods disclosed herein implement steady-state and fast transient electronic current limiting through power transistors, including power transistors used as pass elements associated with general purpose drivers. Embodiments herein prevent excessive steady-state current flow through one or more driver pass elements and/or through load elements in series with the pass element(s) via a current sensing and driver preamplifier feedback loop. A transient over-current protection circuit includes a fast transient switch and a transient over-current control circuit. The transient over-current control circuit rectifies one or more transient voltage spikes to create a momentary direct current (DC) voltage power supply (MVS) to power a fast transient driver circuit and to trip the fast transient switch. The fast transient switch discharges a transient pass element input voltage (e.g., a gate voltage on a MOSFET power transistor in some embodiments) and terminates current flow through the pass element current channel.

20 Claims, 5 Drawing Sheets

DRIVER CURRENT CONTROL APPARATUS AND METHODS

TECHNICAL FIELD

Structures described herein relate to electronic circuits, including current-limiting circuits associated with power transistors and general purpose drivers.

BACKGROUND INFORMATION

Figure 1:
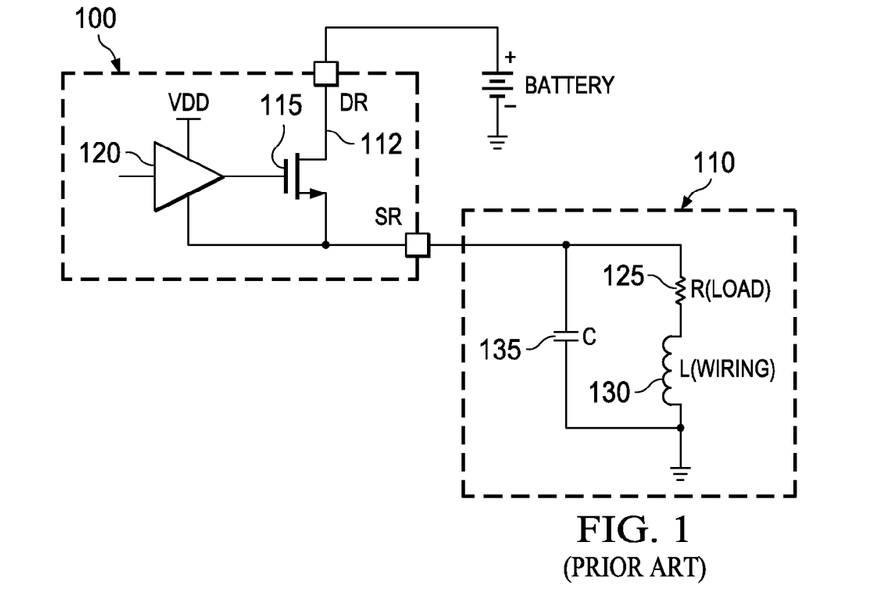
FIG. 1 is a prior-art schematic diagram of a general purpose driver and an example load circuit in a high-side configuration.
Figure 2:
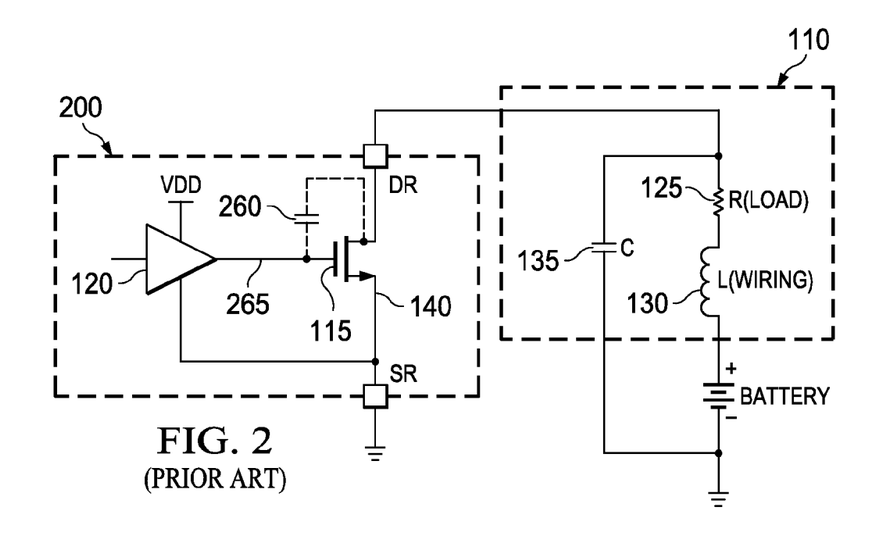
FIG. 2 is a prior-art schematic diagram of a general purpose driver and an example load circuit in a low-side configuration.

FIGs. 1 and 2 are prior-art schematic diagrams of general purpose drivers 100 and 200 and example load circuits 110. General purpose configurable drivers provide regulated currents for applications such as light-emitting diodes (LEDs), "squibs" (small explosive devices) used in automobile air bag deployment systems, etc.

FIG. 1 illustrates a "high side" configuration, so-called because the load circuit 110 is switched to the high side (e.g., to the drain 112 in this particular example) of the pass element 115. The pass element 115 is typically driven by a preamplifier (e.g., the preamplifier 120) and passes current to the load circuit 110. In an example automobile application, R(LOAD) 125 may represent one or more LEDs, an airbag squib, etc. as previously mentioned. L(WIRING) 130 and C 135 are included in the model of the load circuit 110 to clarify that the load circuit 110 may, generally speaking, be an RLC circuit. The RLC nature of the load circuit 110 has important implications for circuits and methods used to protect the general-purpose drivers 100 and 200 as further described below.

FIG. 2 illustrates a "low side" configuration, so-called because the load circuit 110 is switched to the low side (e.g., to the source 140 in this particular example) of the pass element 115. Although the low side configuration will be used for example purposes throughout this Application, the principles, explanations, and claims apply equally to high side and low side configurations.

Figure 3:
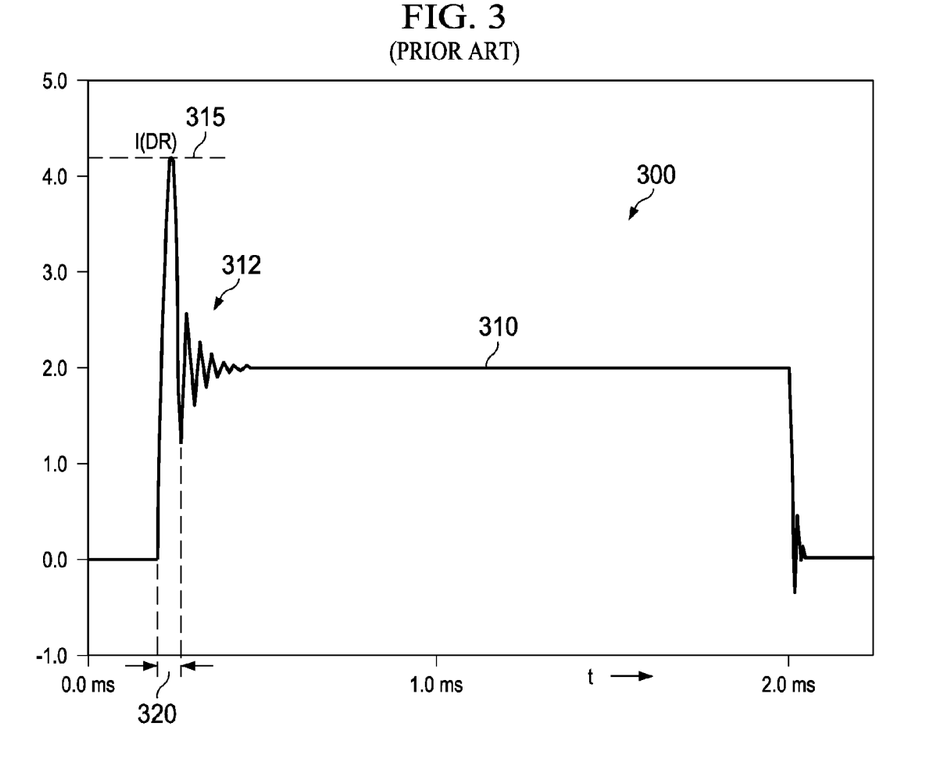
FIG. 3 is a prior-art waveform showing transient and steady-state over-current conditions that may occur due to short-circuits to supply or ground rails at a general purpose driver and/or at a load connected to such driver.

FIG. 3 is a prior-art waveform 300 showing transient and steady-state over-current conditions that may occur due to short-circuits to supply or ground rails at a general purpose driver and/or at a load connected to such driver. Over-current conditions that can result in damage to components of the load circuit 110 and/or to the drivers 100 and 200 fall into several categories. The delivered current should be stable when the driver is enabled. When the drivers 100 or 200 are powered on and enabled, a sudden decrease in the value of R(LOAD) 125 could cause excess current flow 310 through the pass element 115 and damage to the latter component. Such might be the case, for example, if R(LOAD) 125 represents a string of LEDs in series and a short to ground occurs somewhere within the series connection. Such a condition could decrease the resistance of R(LOAD) 125, causing the excess current flow 310 through the pass element 115.

When the drivers 100, 200 are in an OFF (disabled) state and if a dynamic short to battery or ground occurs either in the powered state or the unpowered state of the device, the transient energy 312 delivered to the load 110 and/or to the pass element 115 should be limited to prevent either of those components from possible destruction. This translates into a requirement for limiting the peak current level 315 and its duration 320 when the drivers 100, 200 are in the disabled state. And, design steps taken to control the transient energy 312 including the peak transient current 315 must not affect the performance of current limitation circuitry included to protect steady-state over-current conditions described above when the drivers 100, 200 are in the ON (enabled) state.

A transient over-current condition can result when the drivers 100, 200 are either powered on and in the disabled state or powered off. The reason is that the drain-to-gate Miller capacitance 260 of FIG. 2 is typically large for a large power field effect transistor (FET) such as may be used to implement the pass element 115. A short-to-battery condition may cause a voltage spike at the drain of the of the pass element 115. Such a condition may occur, for example, when replacing a car battery and connecting first the negative lead and then the positive lead. The voltage spike may charge the Miller capacitance 260, resulting in a voltage on the input 265 of the pass element 115 and biasing the pass element 115 to a conductive state. In an example case of the driver 200 being a squib driver designed to deploy an air bag under emergency conditions, the driver 200 would normally be powered on but remain in a disabled state under non-emergency conditions. Without transient voltage spike protection, simply connecting the car battery might cause squib firing and air bag deployment.

SUMMARY OF THE INVENTION

Apparatus and methods disclosed herein implement steady-state and fast transient electronic current limiting through power transistors, including power transistors used as pass elements associated with general purpose drivers. Embodiments herein prevent excessive steady-state current flow through one or more driver pass elements and/or through load elements in series with the pass element(s) via current balancing through a current regulating preamplifier.

Such embodiments also employ a sense element with an input coupled to the pass element input and a drain-to-source equalizer circuit to help ensure accurate current sensing and current balancing between the sense element and the pass element in a 1:N ratio. The current sense element and the preamplifier contribute to a current regulation loop with negative feedback. The feedback loop regulates current through the pass element to a steady-state over-current limitation value when high currents might otherwise flow through the pass element. A current path including a current channel associated with the sense element causes the current regulating preamplifier output voltage to decrease in the case of a steady-state over-current condition, thus reducing drive to the pass element. Steady-state over-current protection is available when the driver circuitry is powered on.

A transient over-current protection circuit includes a fast transient switch and a transient over-current control circuit. The transient over-current control circuit rectifies one or more transient voltage spikes to create a momentary direct current (DC) voltage power supply (MVS) to power a fast transient driver circuit and to trip the fast transient switch. The fast transient switch discharges a transient pass element input voltage (e.g., a gate voltage on a MOSFET power transistor in some embodiments). The transient input voltage is caused by a charge transferred to the pass element input terminal via an internal Miller gate-to-drain capacitance upon the occurrence of transient voltage spikes at a current channel terminal associated with the pass element (e.g., at a MOSFET drain terminal).

DETAILED DESCRIPTION

Figure 4:
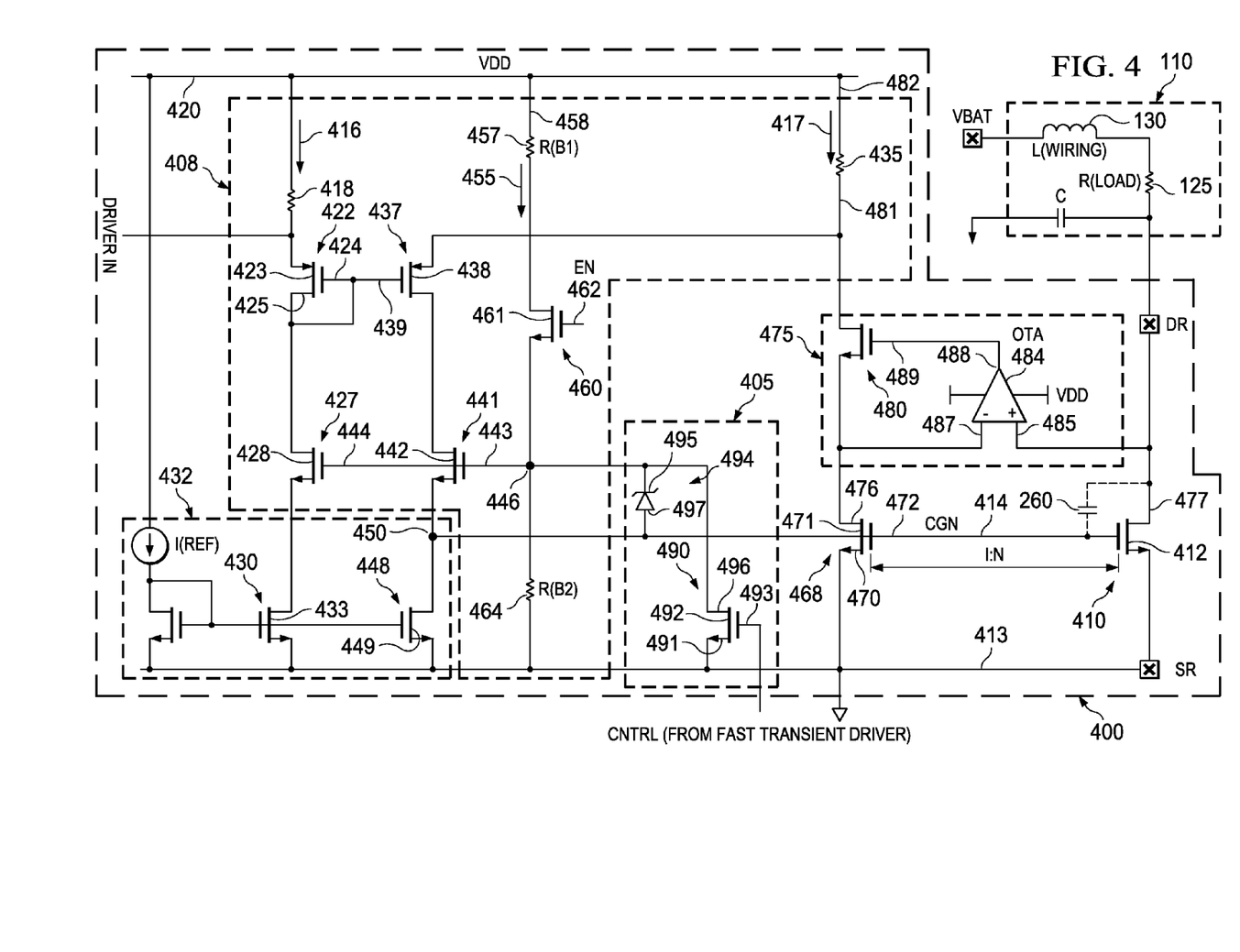
FIG. 4 is a schematic diagram of a general purpose driver and electronic current-limiting apparatus according to various example embodiments of the invention.

FIG. 4 is a schematic diagram of a general purpose driver and electronic current-limiting apparatus 400 according to various example embodiments of the invention. The driver and current-limiting apparatus 400 includes a steady-state over-current protection circuit and a fast transient switch 405 associated with a transient over-current protection circuit. A transient over-current control circuit portion of the transient over-current protection circuit is described below in conjunction with a detailed description of FIG. 5. FIG. 4 additionally illustrates an example driver load circuit 110 as previously described.

The driver and electronic current-limiting apparatus 400 includes a current regulating preamplifier 408. The current regulating preamplifier 408 establishes a desired level of current through current-bearing components of the load circuit 110, including load resistance 125 and inductance 130. The current-bearing components 125 and 130 of the load 110 will be referred to hereinafter simply as "the load."

The apparatus 400 includes a pass element 410. The pass element 410 includes a current channel 412 coupled in series with the load (e.g., in series between the load and a ground rail 413 in the example low side configuration of FIG. 4). The pass element 410 receives a drive signal from the preamplifier 408 at an input terminal (common gate node "CGN") 414 of the pass element 410. The preamplifier 408 provides the desired gate-source voltage for the pass element to pass the current through the current channel 412, set by the R(LOAD). The apparatus 400 is capable of detecting a steady-state over-current condition through the pass element 410.

The current regulating preamplifier 408 includes a first current path 416 to conduct a first steady-state current and a second current path 417 to conduct a second steady-state current. The first current path 416 includes a first reference resistor 418 coupled to a positive voltage rail 420. The first current path 416 also includes a first preamplifier transistor 422 with a current channel 423 coupled in series with the first reference resistor 418. An input 424 of the first preamplifier transistor 422 is coupled to a lower-voltage terminal 425 of the current channel 423.

The first current path 416 further includes a second preamplifier transistor 427 with a current channel 428 coupled in series with the first preamplifier transistor 422. The first current path 416 also includes a first output transistor 430 of a dual-output current mirror 432. The dual-output current mirror 432 establishes the first and second steady-state currents along the first and second current paths 416 and 417, respectively. A current channel 433 of the first output transistor 430 is coupled in series between the second preamplifier transistor 427 and the ground rail 413.

The second current path 417 of the current regulating preamplifier 408 conducts the second steady-state current, mentioned above, and also detects any steady-state over-current condition. The second current path 417 includes a second reference resistor 435 coupled to the positive voltage rail 420. The second current path 417 also includes a third preamplifier transistor 437. A current channel 438 of the third preamplifier transistor 437 is coupled in series with the second reference resistor 435. An input 439 of the third preamplifier transistor 437 is coupled to the input 424 of the first preamplifier transistor 422.

The second current path 417 also includes a fourth preamplifier transistor 441. The fourth preamplifier transistor 441 includes a current channel 442 coupled in series with the third preamplifier transistor 437. An input 443 of the fourth preamplifier transistor 441 is coupled to an input 444 of the second preamplifier transistor 427 and to a preamplifier bias node 446. A second output transistor 448 of the dual-output current mirror 432 includes a current channel 449. The current channel 449 is coupled in series between the current channel 442 of the fourth preamplifier transistor 441 and the ground rail 413. A node 450 between the current channel 442 of the fourth preamplifier transistor 441 and the current channel 449 of the second output transistor 448 of the current mirror 432 is coupled to the CGN 414 as a preamplifier output terminal.

The current regulating preamplifier 408 also includes a biasing and enable path 455. The biasing and enable path 455 provides a bias voltage at the preamplifier bias node 446 and is used to enable and disable the preamplifier 408. The biasing and enable path 455 includes a first bias resistor 457. A first terminal 458 of the first bias resistor 457 is coupled to the positive voltage rail 420. An enable switching transistor 460 includes a current channel 461 coupled in series between the first bias resistor 457 and the preamplifier bias node 446. The enable switching transistor 460 also includes an enable ("EN") input terminal 462. The enable input 462 is used to enable/disable the preamplifier 408 while operating voltage is applied between the positive voltage rail 420 and the ground rail 413. A second bias resistor 464 is coupled between the preamplifier bias node 446 and the ground rail 413.

The driver and current-limiting apparatus 400 also includes a current sense element 468. The current sense element 468 is matched to the pass element 410 via a finger size ratio 1:N such that, for each unit of current flowing through the current sense element 468, N units of current flow through the pass element 410. A low-voltage terminal 470 of a current channel 471 of the current sense element 468 is coupled to the ground rail 413. An input terminal 472 of the current sense element 468 is coupled to the CGN 414.

The driver and current-limiting apparatus 400 further includes a drain-to-source equalizer 475. The drain-to-source equalizer 475 is coupled to a higher-voltage terminal 476 of the current channel 471 of the current sense element 468 and to a higher-voltage terminal 477 of the current channel 412 of the pass element 410. The drain-to-source equalizer 475 maintains an equal drain-to-source voltage across the current channels 412 and 471 of the pass element 410 and the current sense element 468, respectively.

It is noted that the terminal 477 is also referred to herein as the "DR" terminal as it connected to the drain of the pass element 410 in the example apparatus 400 where the pass element 410 is illustrated using an NMOS transistor. However, this nomenclature is not intended to limit generality. The pass element 410 may be implemented with any electronic current control device such as a transistor with a current channel and with control of current through the current channel proportional to a voltage on or current through an input terminal of the current control device.

The drain-to-source equalizer 475 includes a drain-to-source equalizer transistor 480. The drain-to-source equalizer transistor 480 is coupled in series between a lower-voltage terminal 481 of the second reference resistor 435 and the current channel 471 of the current sense element 468. A higher-voltage terminal 482 of the second reference resistor 435 is coupled to the positive voltage rail 420.

The drain-to-source equalizer 475 also includes an operational transconductance amplifier (OTA) 484. A non-inverting input 485 of the OTA 484 is coupled to the higher-voltage terminal 477 of the current channel 412 of the pass element 410. An inverting input 487 of the OTA 484 is coupled to the higher-voltage terminal 476 of the current channel 471 associated with the current sense element 468. An output 488 of the OTA 484 is coupled to an input 489 of the drain-to-source equalization transistor 480.

The driver and current-limiting apparatus 400 also includes the fast transient switch 405 associated with the transient over-current protection circuit, as previously mentioned. The fast transient switch 405 is communicatively coupled between the CGN 414 and the ground rail 413 to discharge an electrical charge accumulated at the CGN 414 of the pass element 410. The electrical charge accumulates on the CGN 414 as a consequence of a transient voltage spike/surge at the DR terminal 477 of the current channel 412 of the pass element 410. The voltage spike/surge at the DR terminal 477 is coupled via a Miller capacitance 260 to the CGN 414 as previously mentioned. The electrical charge may result in a bias voltage on the CGN 414 capable of causing excessive conduction through the current channel 412 of the pass element 410 whether or not the driver and current-limiting apparatus 400 is powered on.

The fast transient switch 405 includes a fast transient switching element 490. A first terminal 491 of a current channel 492 of the fast transient switching element 490 is coupled to the ground rail 413. A control input 493 of the fast transient switching element 490 is communicatively coupled to a transient over-current control circuit (not shown on FIG. 4). It is noted that the speed with which a transient current pulse is suppressed may be dependent upon the switching speed of the fast transient switching element 490. In some embodiments, the fast transient switching element 490 may be selected and/or its geometries developed to enhance the combination of its switching speed and its current dissipation capability.

The fast transient switch 405 also includes a switching diode 494. A cathode 495 of the switching diode 494 is coupled to a second terminal 496 of the current channel 492 of the fast transient switching element 490. An anode 497 of the switching diode 494 is coupled to the CGN 414. In some embodiments, the switching diode may be a zener diode. A detection circuit associated with the transient over-current control circuit causes the fast transient switching element 490 to conduct upon sensing a transient voltage spike on the DR terminal 477, as further described below. Doing so forward biases the switching diode 494 and discharges any charge accumulated on the CGN 414 through the switching diode 494 and the current channel 492 of the fast transient switching element 490 to the ground rail 413.

Figure 5:
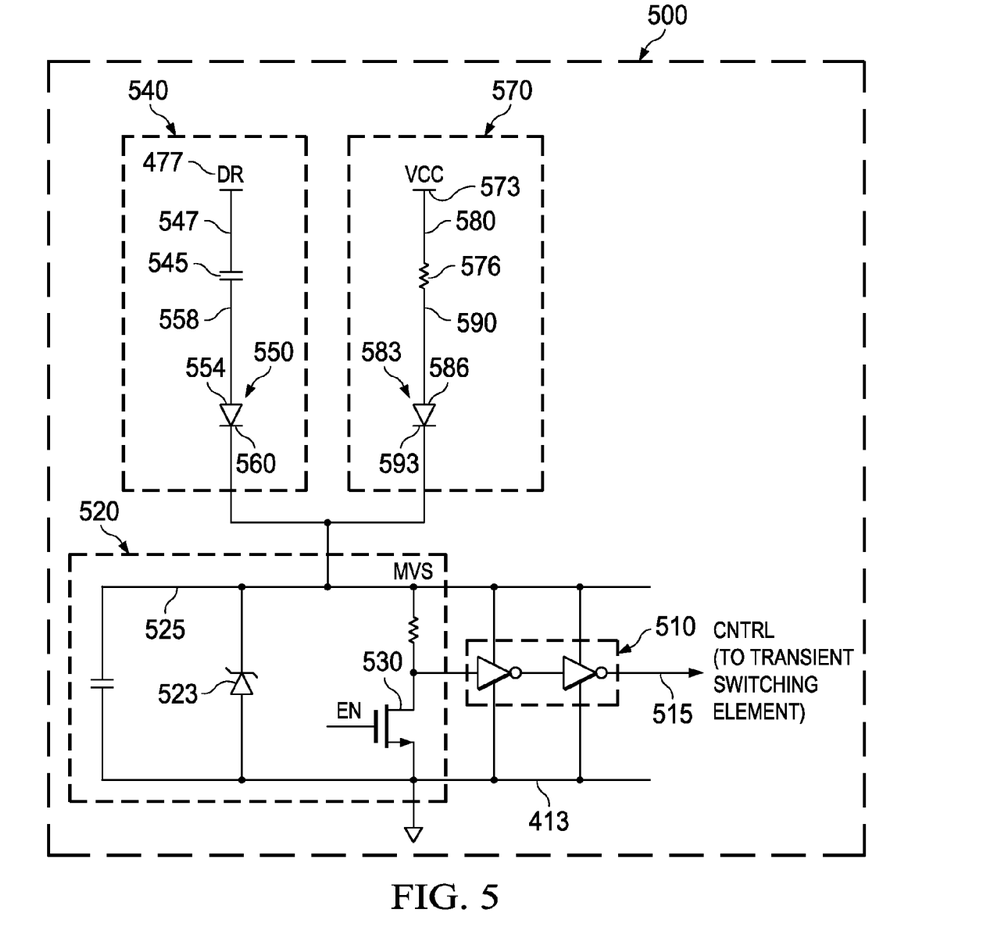
FIG. 5 is a schematic diagram of a transient over-current control circuit according to various example embodiments.

FIG. 5 is a schematic diagram of a transient over-current control circuit 500 according to various example embodiments. Together, the transient over-current control circuit 500 and the fast transient switch 405 of FIG. 4 form the transient over-current protection circuit. The transient over-current protection circuit protects the driver 400 and/or load circuit 110 from the fast transient portion 312 of the waveform 300 of FIG. 3.

The transient over-current control circuit 500 includes a fast transient driver 510. The fast transient driver 510 is communicatively coupled to the input terminal 493 of the fast transient switching element 490 (FIG. 4) via a control signal (CNTRL) output 515 of the fast transient driver 510. Activating the CNTRL output 515 causes the fast transient switching element 490 to conduct, providing that the preamplifier 408 is not enabled and is in either a powered-on state or a powered-off state when a voltage surge occurs.

The transient over-current control circuit includes 500 also includes a momentary voltage supply (MVS) 520 communicatively coupled to the fast transient driver 510. The MVS 520 powers the fast transient driver 510 and places the CNTRL output 515 in an active state providing that the preamplifier 408 is not enabled. The MVS 520 includes an MVS voltage control element 523. The MVS voltage control element 523 is communicatively coupled between an MVS rail 525 and the ground rail 413 to establish a maximum value of MVS voltage. The MVS also includes an MVS disable switch 530. The MVS disable switch 530 is communicatively coupled between the MVS rail 525 and the ground rail 413 to disable the fast transient switch 405 when the preamplifier 408 is enabled.

The transient over-current control circuit includes 500 further includes a charge accumulation circuit 540. The charge accumulation circuit 540 is coupled between the DR terminal 477 of the current channel 412 of the pass element 410 and the MVS rail 525. The charge accumulation circuit 540 rectifies the transient voltage spikes occurring at the DR terminal 477 in order to create the MVS DC voltage. The charge accumulation circuit 540 includes a charge accumulation capacitor 545 with a first terminal 547 communicatively coupled to the DR terminal 477. The charge accumulation circuit 540 also includes a diode 550. An anode terminal 554 of the diode 550 is coupled to a second terminal 558 of the charge accumulation capacitor 545. A cathode terminal 560 of the diode 550 is coupled to the MVS rail 525.

The transient over-current control circuit 500 further includes a steady-state supply circuit 570. The steady-state supply circuit 570 is coupled between a steady-state power supply voltage rail 573 and the MVS rail 525 as an alternate source of the MVS voltage. The steady-state supply circuit 570 includes a resistor 576. A first terminal 580 of the resistor 576 is communicatively coupled to the steady-state power supply voltage rail 573. The steady-state supply circuit 570 also includes a diode 583. An anode terminal 586 of the diode 583 is coupled to a second terminal 590 of the resistor 576. A cathode terminal 593 of the diode 583 is coupled to the MVS rail 525.

The transient over-current protection circuit, including the fast transient switch 405 of FIG. 4 and the transient over-current control circuit 500 of FIG. 5, is described above in the context of a general purpose electronic driver. It is noted, however, that applications of the transient over-current protection circuit are not so limited. Various embodiments and equivalents of the transient over-current protection circuit may be used generally to limit transient currents through a current channel of a power transistor. The transient currents are caused by a voltage transient at a terminal of the current channel being fed to an input of the power transistor via an internal Miller capacitance between the current channel terminal and the power transistor input as described above.

Figure 6:
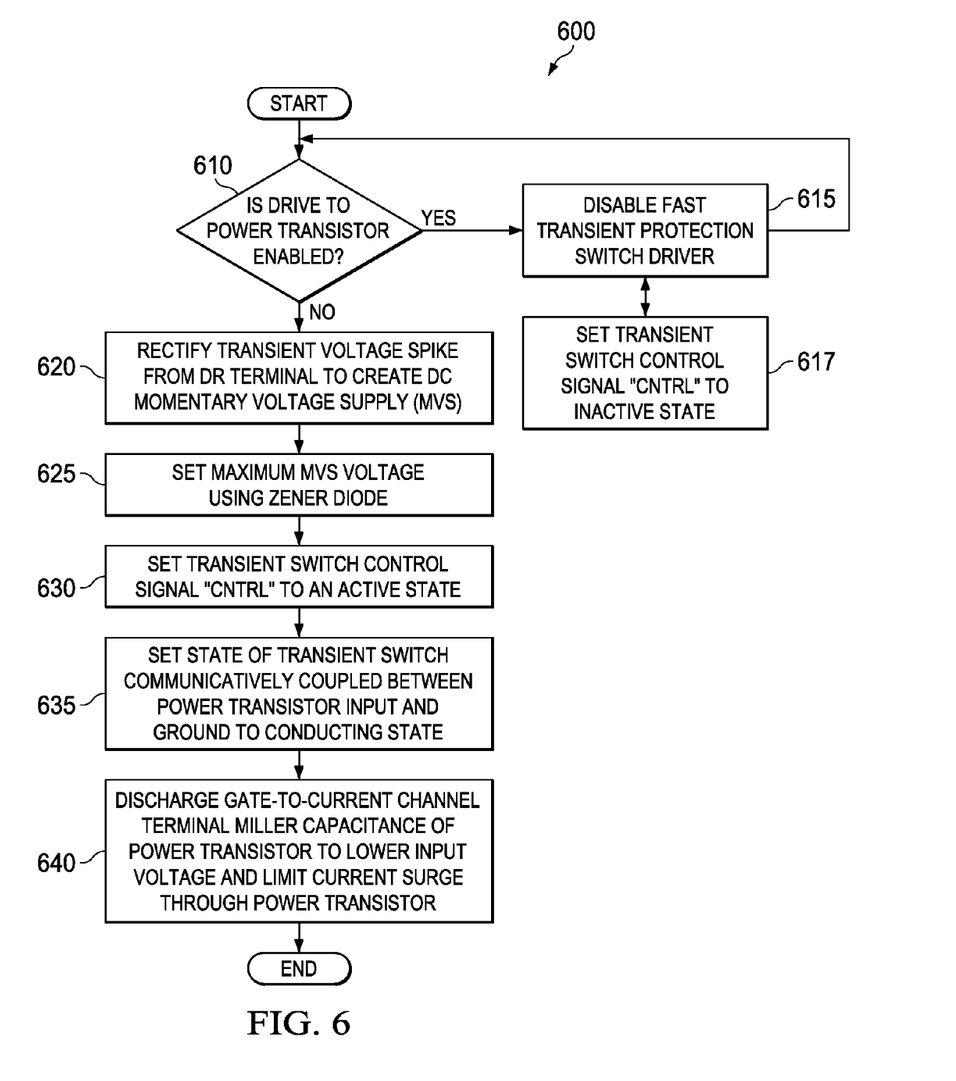
FIG. 6 is a flow diagram of a method of controlling transient over-current conditions in a power transistor according to various example activities.

FIG. 6 is a flow diagram of a method 600 of controlling transient over-current conditions in a power transistor according to various example activities. The method 600 may commence at decision block 610 with determining whether the power transistor is currently subject to intentionally active use. For example, a drive signal to the power transistor may be enabled during times when use of the power transistor is anticipated and disabled at times when conduction of the power transistor would not be desirable. Such drive signal may include an output of amplification and/or control stages preceding the power transistor stage.

If the power transistor is currently subject to intentionally active use, the method 600 may include disabling a driver associated with a transient over-current control circuit, at block 615. The method 600 may disable the transient over-current control circuit driver by inactivating a CNTRL signal output of the driver, at block 617. Some versions of the method 600 may cause an MVS supply disable switch communicatively coupled between the MVS rail and a ground rail to conduct by setting an enable signal ("EN") at an input to the MVS supply disable switch at a time when the power transistor is subject to intentionally active use. The method 600 may then return to the start of the decision block 610.

If the power transistor is not currently subject to intentionally active use (e.g., a preamplifier, control, or other stage preceding the power transistor is disabled), the method 600 continues at block 620. The method activity at block 620 includes rectifying one or more transient voltage spikes occurring at a terminal of a current channel of the power transistor to create a DC MVS rail to power a fast transient driver. The method 600 also includes setting a maximum MVS voltage using a zener diode between an MVS rail and a ground rail, at block 625.

The method 600 further includes switching a transient switch control signal ("CNTRL") to an active state at the fast transient driver upon the occurrence of the transient voltage spikes, at block 630. The method 600 also includes switching a transient switch with a current channel communicatively coupled to an input of the power transistor to a conducting state upon receipt of the CNTRL signal, at block 635.

The method 600 terminates with discharging a gate-to-current channel terminal Miller capacitance associated with the power transistor, at block 640. The Miller capacitance is discharged in order to decrease a voltage at the input of the power transistor and to thus limit the surge current through the power transistor.

Apparatus described herein may be useful in applications other than current-limited general purpose driver apparatus. Examples of the electronic current-limiting apparatus 400 and 500 and the current-limiting method 600 are intended to provide a general understanding of the structures of various embodiments. They are not intended to serve as complete descriptions of all elements and features of apparatus and systems that might make use of these structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), motor vehicles, medical devices (e.g., heart monitor, blood pressure monitor, etc.), set top boxes, and others.

Apparatus and methods disclosed herein implement steady-state and fast transient electronic current limiting through power transistors, including power transistors used as pass elements associated with general purpose drivers. Embodiments herein prevent excessive steady-state current flow through one or more driver pass elements and/or through load elements in series with the pass element(s) via a current sensing and driver preamplifier feedback loop. A transient over-current protection circuit includes a fast transient switch and a transient over-current control circuit. The transient over-current control circuit rectifies one or more transient voltage spikes and trips the fast transient switch. Doing so creates an extremely fast current-control mechanism, since the voltage spike itself results in discharging the transient gate voltage caused by the voltage spike with little intervening propagation delay. Transient current settling times on the order of 1 µs may be achieved.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A driver and electronic current-limiting apparatus, comprising:
   a current regulating preamplifier to establish a desired level of current through a load and to detect a steady-state over-current condition;
   a pass element with a current channel coupled in series with the load to receive a drive signal from the preamplifier at an input terminal of the pass element and to control the desired level of current via the drive signal; and
   a fast transient switch associated with a transient over-current protection circuit, the fast transient switch communicatively coupled between the input terminal of the pass element and a ground rail to discharge an electrical charge accumulated at the input terminal of the pass element as a consequence of at least one transient voltage spike at a first terminal of the pass element current channel, the electrical charge resulting in a bias voltage on the input terminal of the pass element, the bias voltage capable of causing excessive conduction through the current channel of the pass element.

2. The driver and electronic current-limiting apparatus of claim 1, the electrical charge accumulated at the input terminal of the pass element resulting from a voltage surge at the first terminal of the pass element and coupled via a Miller capacitance to the input terminal of the pass element.

3. The driver and electronic current-limiting apparatus of claim 1, the fast transient switch further comprising:
   a fast transient switching element, a first terminal of a current channel of the fast transient switching element coupled to the ground rail and a control input of the fast transient switching element communicatively coupled to a transient over-current control circuit; and
   a switching diode, a cathode of the switching diode coupled to a second terminal of the current channel of the fast transient switching element and an anode of the switching diode coupled to the input terminal of the pass element.

4. The driver and electronic current-limiting apparatus of claim 3, the switching diode being a zener diode.

5. The driver and electronic current-limiting apparatus of claim 3, the transient over-current control circuit associated with the transient over-current protection circuit further comprising:
   a fast transient driver communicatively coupled to an input terminal of the fast transient switching element via a control signal output of the fast transient driver to cause the fast transient switching element to conduct during a time when the preamplifier is not enabled and is in either a powered-on state or a powered-off state, and the voltage surge occurs;
   a momentary voltage supply (MVS) communicatively coupled to the fast transient driver to power the fast transient driver and to place the control signal output in an active state providing that the preamplifier is not enabled; and
   a charge accumulation circuit coupled between the first terminal of the pass element current channel and an MVS rail to rectify the transient voltage spikes occurring at the first terminal of the pass element in order to create an MVS voltage.

6. The driver and electronic current-limiting apparatus of claim 5, the MVS further comprising:
   an MVS voltage control element communicatively coupled between the MVS rail and the ground rail to establish a maximum value of the MVS voltage.

7. The driver and electronic current-limiting apparatus of claim 5, the MVS further comprising:
   an MVS disable switch communicatively coupled between the MVS rail and the ground rail to disable the fast transient switch during a period when the preamplifier is enabled.

8. The driver and electronic current-limiting apparatus of claim 5, the charge accumulation circuit further comprising:
   a charge accumulation capacitor with a first terminal communicatively coupled to the first terminal of the pass element; and
   a diode with an anode terminal coupled to a second terminal of the charge accumulation capacitor and a cathode terminal coupled to the MVS rail.

9. The driver and electronic current-limiting apparatus of claim 5, the transient over-current control circuit further comprising:
   a steady-state supply circuit coupled between a steady-state power supply voltage rail and the MVS rail in order to create the MVS voltage.

10. The driver and electronic current-limiting apparatus of claim 9, the steady-state supply circuit further comprising:
    a resistor with a first terminal communicatively coupled to the steady-state power supply voltage rail; and
    a diode with an anode terminal coupled to a second terminal of the resistor and a cathode terminal coupled to the MVS rail.

11. The driver and electronic current-limiting apparatus of claim 1, the current regulating preamplifier further comprising:
    a first current path to conduct a first steady-state current;
    a second current path to conduct a second steady-state current and to detect the steady-state over-current condition;
    a dual-output current mirror to establish the first and second steady-state currents; and
    a biasing and enable path to provide a bias voltage at a preamplifier bias node and to enable and disable the preamplifier.

12. The driver and electronic current-limiting apparatus of claim 11, the first current path comprising:
    a reference resistor coupled to a positive voltage rail;
    a first preamplifier transistor with a current channel coupled in series with the reference resistor, an input of the first preamplifier transistor coupled to a lower-voltage terminal of the current channel;
    a second preamplifier transistor with a current channel coupled in series with the first preamplifier transistor; and
    a first output transistor of the dual-output current mirror with a current channel coupled in series between the second preamplifier transistor and the ground rail.

13. The driver and electronic current-limiting apparatus of claim 12, wherein the reference resistor is a first reference resistor, the second current path comprising:
    a second reference resistor coupled to the positive voltage rail;
    a third preamplifier transistor with a current channel coupled in series with the second reference resistor, an input of the third preamplifier transistor coupled to the input of the first preamplifier transistor;
    a fourth preamplifier transistor with a current channel coupled in series with the third preamplifier transistor, an input of the fourth preamplifier transistor coupled to an input of the second preamplifier transistor and to the preamplifier bias node; and
    a second output transistor of the dual-output current mirror with a current channel coupled in series between the current channel of the fourth preamplifier transistor and the ground rail, a node between the current channel of the fourth preamplifier transistor and the current channel of the second output transistor of the current mirror coupled to the input terminal of the pass element, the node forming a preamplifier output terminal.

14. The driver and electronic current-limiting apparatus of claim 11, the biasing and enable path comprising:
    a first bias resistor with a first terminal coupled to a positive voltage rail;
    an enable switching transistor with a current channel coupled in series between the first bias resistor and the preamplifier bias node; and a second bias resistor coupled between the preamplifier bias node and the ground rail.

15. The driver and electronic current-limiting apparatus of claim 1, further comprising:
a current sense element, a low-voltage terminal of a current channel of the current sense element coupled to a ground rail and an input of the current sense element coupled to the input terminal of the pass element;
a drain-to-source equalizer coupled to a higher-voltage terminal of the current channel of the current sense element and to a higher-voltage terminal of the current channel of the pass element to maintain an equal drain-to-source voltage across the current channels of the pass element and the current sense element, respectively, the drain-to-source equalizer further comprising:
a drain-to-source equalizer transistor coupled in series between a lower-voltage terminal of a reference resistor and the current channel of the current sense element, a higher-voltage terminal of the reference resistor coupled to a positive voltage rail; and
an operational transconductance amplifier (OTA) with a non-inverting input coupled to the higher-voltage terminal of the current channel of the pass element, an inverting input coupled to a higher-voltage terminal of the current channel associated with the current sense element, and an output of the OTA coupled to an input of the drain-to-source equalization transistor.

16. A fast-transient current-limiting apparatus, comprising:
a fast transient switching element, a first terminal of a current channel of the fast transient switching element communicatively coupled to a ground rail and a control input of the fast transient switching element communicatively coupled to a transient over-current control circuit;
a switching diode, a cathode of the switching diode coupled to a second terminal of the current channel of the fast transient switching element and an anode of the switching diode coupled to a gate of a power transistor with a high Miller capacitance and subject to at least one transient voltage spike at a terminal of a current channel of the power transistor;
a fast transient driver communicatively coupled to an input terminal of the fast transient switching element via a control signal output of the fast transient driver to cause the fast transient switching element to conduct upon an occurrence of the at least one transient voltage spike during a time when the power transistor is not subject to intentionally active use;
a momentary voltage supply (MVS) rail communicatively coupled to the fast transient driver to power the fast transient driver and to place the control signal output in an active state when the power transistor is not subject to intentionally active use;
an MVS voltage control element communicatively coupled between the MVS rail and the ground rail to establish a maximum voltage of the MVS rail;
an MVS disable switch communicatively coupled between the MVS rail and the ground rail to disable the fast transient switch during a period when the power transistor is not subject to intentionally active use; and
a charge accumulation circuit coupled between the terminal of the current channel of the power transistor subject to the at least one transient voltage spike and the MVS rail to rectify the at least one transient voltage spike occurring at the terminal of the current channel of the power transistor in order to create an MVS voltage.

17. The fast-transient current-limiting apparatus of claim 16, the charge accumulation circuit further comprising:
a charge accumulation capacitor with a first terminal communicatively coupled to the terminal of the current channel of the power transistor subject to the at least one transient voltage spike; and
a diode with an anode terminal coupled to a second terminal of the charge accumulation capacitor and a cathode terminal coupled to the MVS rail.

18. A method of limiting a surge current through a power transistor, comprising:
rectifying at least one transient voltage spike occurring at a terminal of a current channel of the power transistor to create a direct current (DC) momentary voltage supply (MVS) rail to power a transient over-current control circuit;
at the transient over-current control circuit, setting a transient switch control signal to an active state upon the occurrence of the at least one transient voltage spike;
setting a fast transient switch with a current channel communicatively coupled to an input of the power transistor to a conducting state using the control signal; and
discharging a gate-to-current channel terminal Miller capacitance associated with the power transistor to decrease a voltage at the input of the power transistor and to limit the surge current through the power transistor.

19. The method of claim 18, further comprising:
setting a maximum MVS voltage using a zener diode between the MVS rail and a ground rail.

20. The method of claim 18, further comprising:
inactivating the control signal using an MVS disable switch communicatively coupled between the MVS rail and a ground rail by setting an enable signal at an input to the MVS disable switch at a time when the power transistor is subject to intentionally active use.

* * * * *